Feb. 11, 1941.   T. LONG ET AL   2,231,812
TIRE INFLATING APPARATUS
Filed Jan. 16, 1939   3 Sheets-Sheet 3
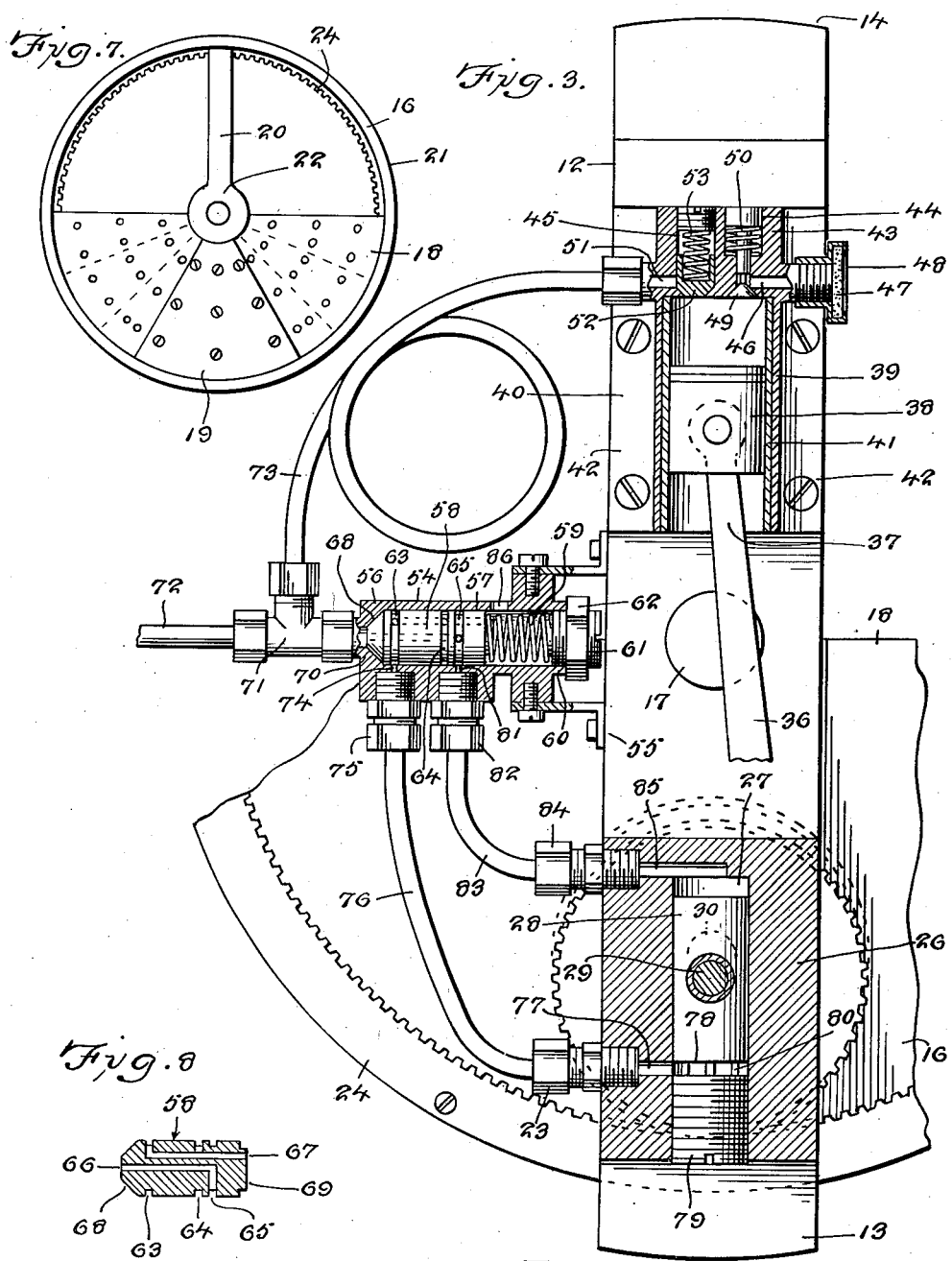
Thomas Long
Rudolph J. Dam   INVENTOR
BY Victor J. Evans & Co.
ATTORNEYS Patented Feb. 11, 1941

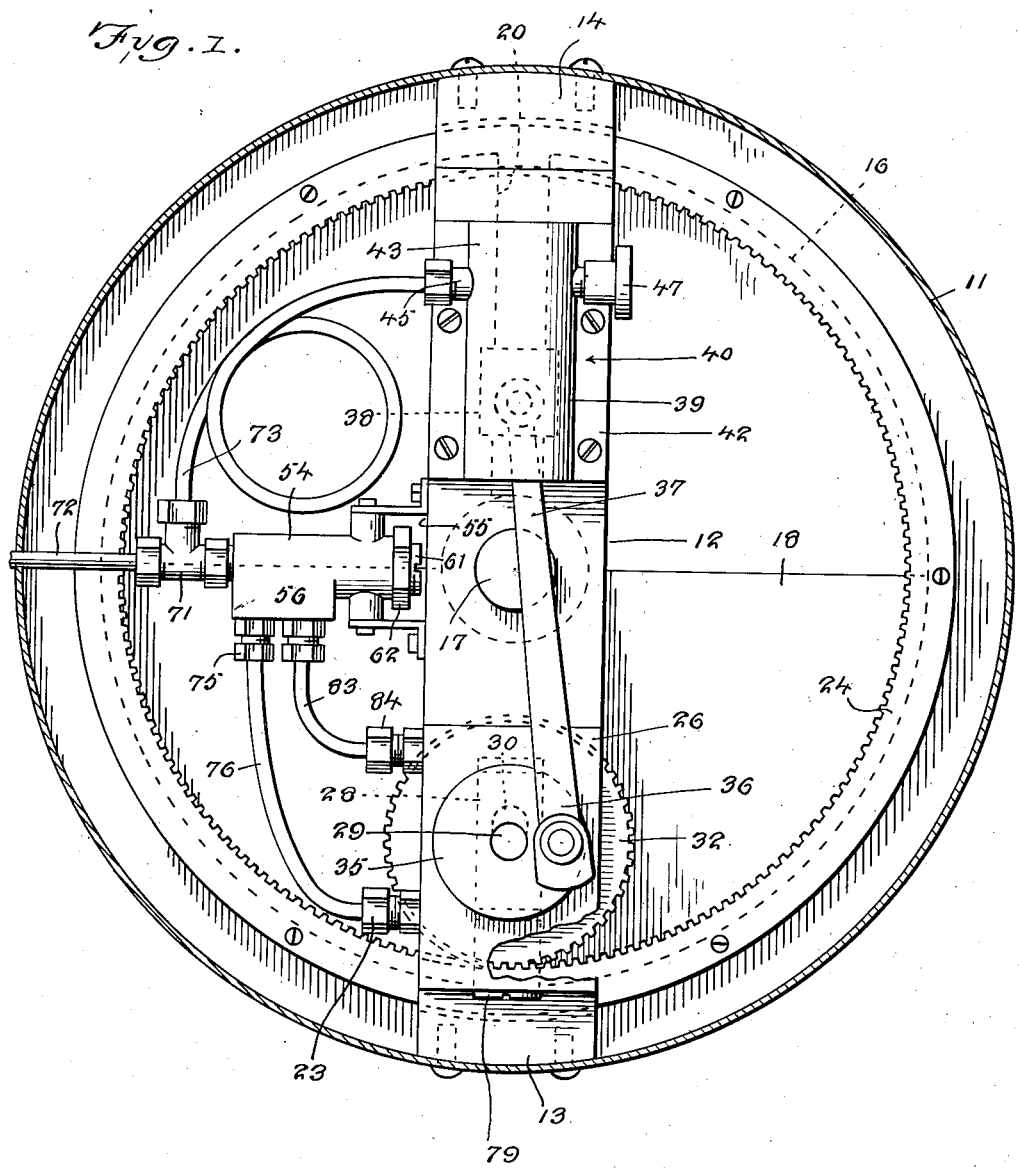

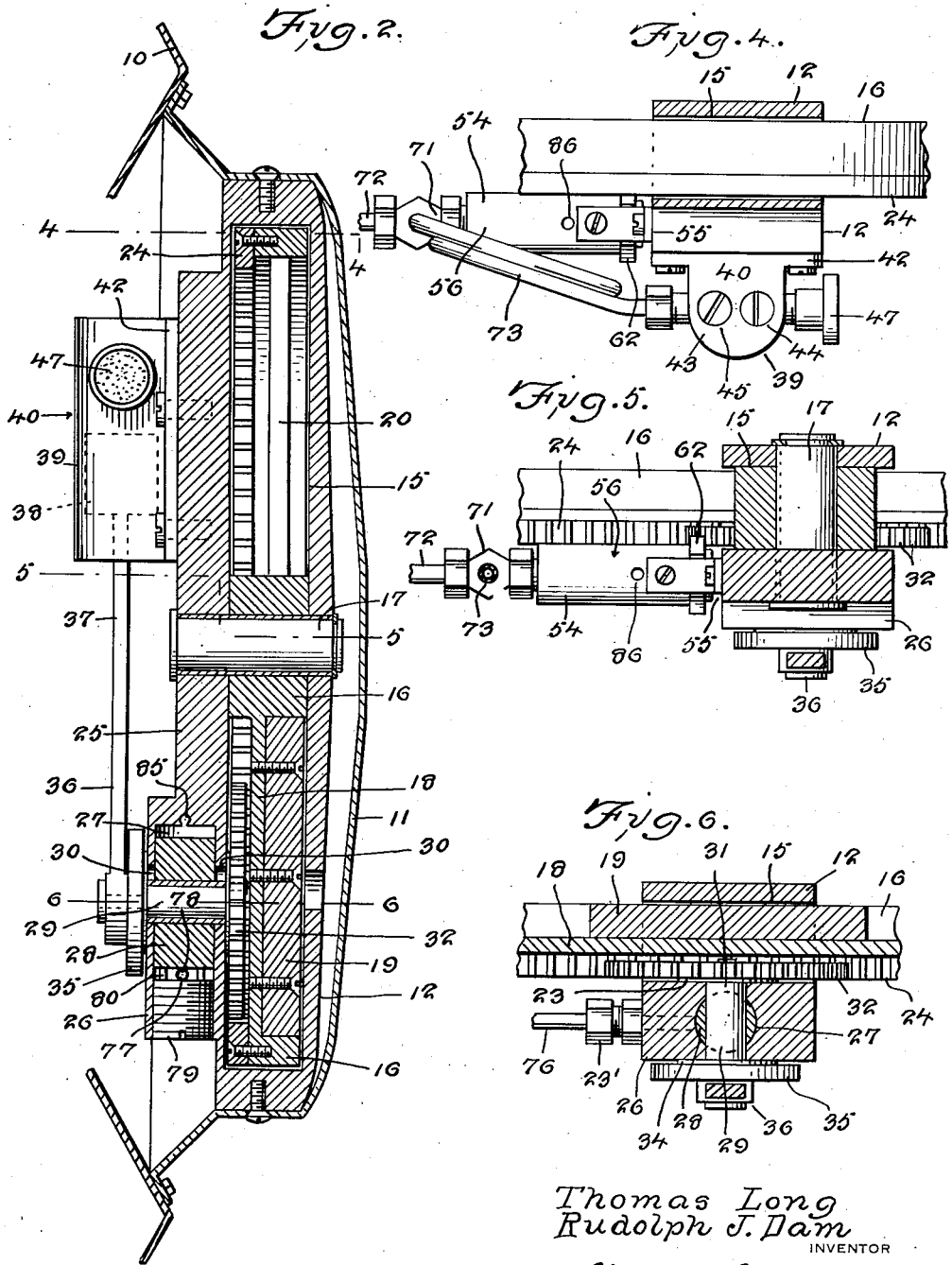

2,231,812

UNITED STATES PATENT OFFICE 2,231,812

TIRE INFLATING APPARATUS

Thomas Long and Rudolph J. Dam, Englewood, N. J., assignors of one-third to Mary E. White, Yonkers, N. Y.

Application January 16, 1939, Serial No. 251,216

5 Claims. (Cl. 152—420)

Our invention relates to automatic tire inflating pumps.

An important object of our invention is the provision of a mechanism that becomes automatically operable when the pressure in the tire falls below a certain predetermined limit.

Another object of our invention is the provision of a mechanism that will reduce the pressure in the tire if the same rises above a predetermined limit.

Yet another object of our invention is to provide a tire inflating pump that can be easily and efficiently attached to any of the standard types of vehicles.

Still another object of our invention is to provide a tire inflating pump that is simple in construction, efficient in operation and inexpensive to manufacture.

Other objects and advantages of our invention will be apparent during the course of the following description.

In the drawings, forming a part of this specification, and in which like numerals are employed to designate like parts throughout the same, Figure 1 is a side elevation of our device, and illustrating its association with an automobile hub, Figure 2 is a longitudinal sectional view thereof, Figure 3 is a fragmentary front elevation of our device, and showing parts in section, Figure 4 is a transverse sectional view, taken on the line 4—4 of Figure 2, Figure 5 is a transverse sectional view, taken on the line 5—5 of Figure 2, Figure 6 is a transverse sectional view, taken on the line 6—6 of Figure 2, Figure 7 is a front elevation of the ring gear embodying a part of our invention, and Figure 8 is a longitudinal sectional view of a valve embodying a part of our invention.

In the accompanying drawings, wherein for the purpose of illustration, is shown a preferred embodiment of our invention, the numeral 10 designates the central portion of an automobile wheel having a substantially circular hub 11 bolted or otherwise secured thereto. The numeral 12 designates a bar frame having its either end 13 and 14 slightly arcuated to be received within the hub 11 and securely bolted therein for rotation therewith. The bar frame 12 is formed with a longitudinal slot 15 in which a wheel 16 is suspended on the spindle 17. The lower half of the wheel 16 is formed with a single web 18 having a plurality of apertures therein to detachably receive the weights 19, and the upper half of the wheel is formed with a single spoke 20 extending between the periphery 21 and hub 22. The periphery 21 of the wheel is spaced slightly from the ends of the slot 15 and is held against rotation with the frame by the weights 19, while secured to the other side of the wheel 16 is a ring gear 24 which is also spaced from the frame 12.

The inner face 25 of the frame is formed with a protuberance 26 having formed therein a cul-de-sac 27. A shaft carrier 28 is slidably mounted within the cul-de-sac 27 and extending transversely therethrough is a spindle 29 either end of which extends through elongated slots 30 provided in either wall of the cul-de-sac 27. Keyed to the inner end 31 of the spindle, and spaced therefrom by washer 23 is a circular gear 32, the teeth of which are engageable with the ring gear when the spindle 29 is resting in the lower portion of the elongated slots 30. Secured to the outer end 33 of the spindle 29, and spaced therefrom by washer 34, is a crank plate 35 which has the connecting rod 36 pivotally attached thereto adjacent its periphery thereof. The opposite end 37 of the connecting rod is secured by a wrist pin connection to the piston 38 which is reciprocally mounted in the cylinder 39. The casting 40 is formed with a depending sleeve 41 which receives the cylinder 39, and extending laterally from either side thereof are flanges 42 which are bolted or otherwise secured to the inner face 25 of the frame 12. The upper portion of the casting 40 is formed into a block 43 in which is provided longitudinally extending bores 44 and 45 communicating at their lower end with the upper end of the cylinder 39. Extending laterally from the bore 44 is an air inlet passage 46 which communicates with the atmosphere through the filter 47 positioned in the flange collar 48. Seated within the bore 44 is a valve 49 which is adapted to open on the down stroke of the piston 38, against the action of the coil spring 50. Extending laterally of the bore 45 is a discharge passage 51, and seated in the bore 45 is a valve 52 adapted to be unseated against the action of the spring 53 on the up stroke of the piston 39.

A three way valve 54 is bolted to the side of the bar frame 12 and includes a casting 56 having a longitudinally extending central bore 57 in which the valve 58 is held normally seated by the coil spring 59. The end 60 of the bore 57 has threaded therein an adjusting screw 61, which carries a lock nut 62 in abutting relation with the end of the casting 56, so that the tension of the spring 59 may be selectively varied and maintained at the desired tension. The valve 58 is formed with spaced annular recesses 63, 64 and 65 and with longitudinally extending bores 66 and 67. The longitudinal bore 66 opens at the seated end 68 of the valve and communicates with the annular recess 65. The longitudinal bore 67 opens at the end 69 of the valve and communicates with the annular recesses 63 and 64, as illustrated in Figure 8. The end 70 of the casting 56 is provided with a T-shaped fitting 71 which communicates with the seated end 68 of the valve 58. The flexible tube 72 extends from the fitting 71 to the tire of the wheel (not shown), and the flexible tubing 73 communicates at its one end with the fitting 71 and at its other end thereof with its discharge passage 51 of the casting 49. When the valve 58 is seated the annular recess 63 aligns with the discharge opening 74 in the casting 56 and threaded therein and communicating therewith is a fitting 75 receiving one end of the tubular connection 76 which extends therefrom to a fitting 23' threaded into the passage 77 in communication with the underface 78 of the shaft carrier 28. An adjusting screw 79 is threaded into the open end of the cul-de-sac 27 and has upstanding prongs 80 extending circumferentially around its inner end to support the lower end of the shaft carrier 28, and the openings between the prongs 80 permit the passage 77 to freely communicate with the underside 78 of the shaft carrier. When the valve 58 is seated, the recess 65 is in communication with the discharge passage 81 in which the fitting 82 is threaded to receive one end of the tubing 83 which extends therefrom to a fitting 84 threaded into a passage 85 leading to the upper end of the cul-de-sac 27.

The operation of my device is as follows:

The bar frame 12 is secured to and rotates with the hub 11 while the wheel 16 and ring gear 24, suspended centrally in the frame, are provided with detachable weights which hold the wheel stationary, and as illustrated in Figure 7, the weights are removable in sections so that the load carried by the wheel may be selectively varied. The adjusting screw 61 may be adjusted and locked in position by the lock nut 62 to properly tension the coil spring 59 against the plunger 58, so that when the spring is properly tensioned it will maintain the pressure within the tire at a predetermined amount.

If the air pressure in the tire falls below the predetermined amount, the shaft carrier 28 will be positioned in the lower portion of the elongated slots 30 in a manner whereby the circular gear 32 be enmeshed with the ring gear 24. The gear 32 is carried by the rotating frame 12 and rotation is affected due to the interlocking engagement thereof with the stationary ring gear 24, and this motion is imparted to the crank plate 35 which has the connecting rod 37 eccentrically attached thereto. As the piston 38 reciprocates within the cylinder 39, air is drawn in the inlet port 46 on the down stroke of the piston and forced into the flexible tubing 73 on the up stroke thereof, and into the tire (not shown) through tube 72. A portion of this air will flow into the central passage 66 in the valve 58 and out through the annular recess 65 into the discharge passage 81 where it will be conducted through tubing 83 into the passage 85 to form a compressed air cushion above the shaft carrier 28 to maintain the same in the lowermost position in the elongated slots 30 and with the circular gear 32 enmeshed with the ring gear 24. As soon as the pressure in the tire reaches the predetermined amount, the back pressure in the tube 72 will be sufficient to unseat the valve 58 against the resilient action of the coil spring 59, so that the annular recess 64 will be in alignment with the discharge passage 81. This will permit the compressed air above the shaft carrier 28 to pass through the tube 83 and into the annular recess 64 where it will be conducted through the longitudinal bore 67 to the discharge port 86 in the casting 56. The excess of pressure in the tube 72 will then have free access to the tube 76 by virtue of the unseating of the valve 58. The pressure in the tube 76 will be directed against the underside of the shaft carrier 28, and will force the same upwardly into the closed end of the cul-de-sac 27 sufficient to bring the circular gear 32 out of engagement with the ring gear 24. When this action occurs, the piston 38 will cease to reciprocate and no air will be pumped into the tire. However, in the event that the pressure in the tire should again fall below the predetermined amount due to leakage, or any other cause the reduced pressure in the passage 72 will once more enable the resilient spring 59 to seat the valve 58, and permit the compressed air on the underside of the shaft carrier 28 to escape to the atmosphere through the tube 76, longitudinal bore 67, and discharge port 86, thereby causing the circular gear 32 to once more enmesh with the ring gear 24 to operate the piston 38 and force air into the tire.

It is evident that should pressure in the tire built up in excess of the predetermined amount due to overheating, or any other cause, the valve 58 will be unseated and the excess pressure can escape through the central passage 66 and out through annular recess 65 which is then aligned with the discharge port 86. When the pressure falls to the predetermined amount the resilient action of the coil spring 59 will be sufficient to overcome the pressure in the tube 72 and to seat the valve 58.

It is to be understood that the form of our invention herewith shown and described is to be taken as a preferred example of the same and that various changes in the size, shape and arrangement of parts may be resorted to without departing from the spirit of our invention, or the scope of the appended claims.

Having thus described our invention we claim:

1. An inflating device comprising a rotating frame, a ring gear journaled to the frame, detachable weight means fastened to the said ring gear to prevent the same from rotating, a shaft carrier having a restricted reciprocating movement in said frame, a shaft extending transversely through said carrier, a gear carried on one end of said shaft and engageable with the said ring gear, a crank plate carried on the other end of the said shaft, a cylinder mounted on said frame, a piston mounted to reciprocate within the said cylinder, a connecting rod joining said piston and the said crank plate, inlet and outlet valve means carried by the said cylinder and communicating with the atmosphere and a tire respectively, and a three way valve mounted on the frame and communicating with the outlet passage of the said first-mentioned valve means and with opposite ends of the said shaft carrier, said valve in one position supplying air to the upper side of said carrier thereby bringing the said gear into engagement with the ring gear and to operate the piston to supply air to the tire, and in another position to supply air to the underside of the said shaft carrier and to permit the release of the air thereabove, and to move the said gear out of engagement with the ring gear.

2. An inflating device comprising a rotating frame, a ring gear journaled to the frame, weight means detachably fastened to the said ring gear to prevent the rotation thereof, a shaft carrier having a restricted reciprocating movement in said frame, a shaft extending transversely through said carrier, a gear carried on one end of the said shaft and engageable with the said ring gear, a crank plate carried on the other end of said shaft, pump means actuated by the said crank plate, inlet and outlet valve means forming a part of the pump and communicating with the atmosphere and a tire respectively, and a three way valve communicating with the said outlet valve means, and with opposite ends of the said shaft carrier in a manner whereby in one position the said last-mentioned valve will supply air to the upper side of the said carrier to move the gear carried thereby into engagement with the said ring gear to operate the said pump means, and in another position to supply air to the underside of the said valve carrier and to permit the release of the air thereabove and to move the said gear out of engagement with the ring gear.

3. An inflating device comprising a frame rotatable with the hub of a vehicle, a ring gear non-rotatably attached thereto, a piston having a restricted reciprocating movement within said frame, a circular gear movable with the said piston and engageable for rotation with the said ring gear, a crank plate rotatable with the said circular gear, pump means actuated by the said crank plate and supplying air to the tire of the vehicle, and valve means receiving a portion of the said air from the pump and connected to opposite ends of the said piston, said valve in one position supplying air to the upper side of the piston to move the said circular gear into engagement with the ring gear to operate the pump and to supply air to the tire, and in another position to supply air to the underside of the said piston and to permit the release of the air thereabove and to move the gear out of engagement with the said ring gear.

4. In combination with an automobile wheel, an inflating device comprising a frame rotatable with the wheel, a stationary ring gear, a piston mounted in the frame and having a restricted reciprocating movement therein, a circular gear movable with the said piston and engageable with and rotated by said ring gear, a crank plate rotatable with the said circular gear, pump means actuated by the said crank plate and discharging air to the tire, valve means receiving a portion of the air from the pump and communicating with opposite ends of the said piston, and spring means cooperative with the valve means to normally direct air to the underside of the piston to hold the said circular gear out of engagement with the ring gear but upon occasions acting to move the valve means to direct the air to the top of the said piston to move the circular gear into engagement with the ring gear.

5. In a tire inflating apparatus a valve casing having an inlet port in one end and a pair of spaced outlet ports opening through the side wall thereof, a spring influenced valve body slidable within said casing and having an annular recess registerable with one of the said outlet ports and a pair of spaced annular recesses separately registerable with the other of the outlet ports, said valve body having a longitudinal passage, one end of which passage opens through one end of the valve body and communicates with the inlet port of the casing and the other end of which passage communicates with one of the said last-mentioned recesses, and an independent longitudinal passage communicating with the other of the said annular recesses and opening through the end of the said valve body remote from the said inlet port of the casing.

THOMAS LONG.
RUDOLPH J. DAM.